Patented May 18, 1937

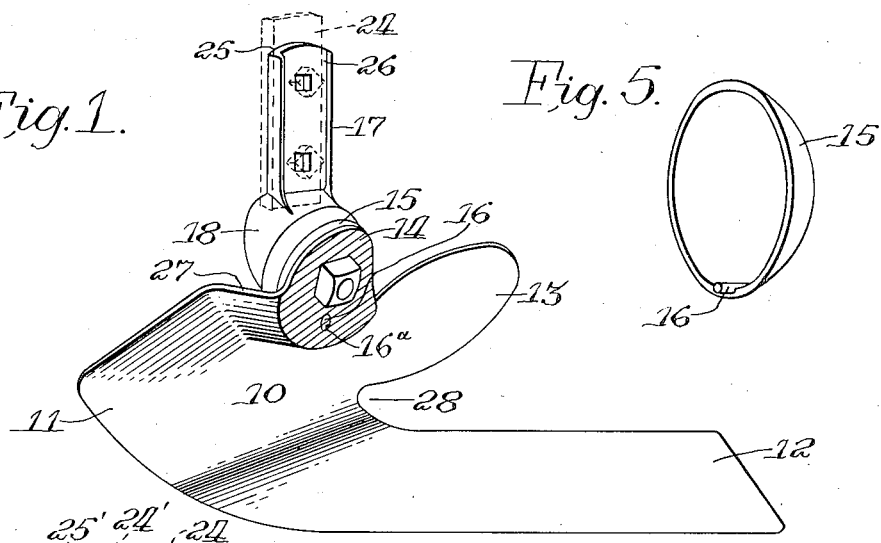

2,080,723

UNITED STATES PATENT OFFICE 2,080,723

KNIFE WEEDER

Alexus C. Lindgren, Chicago, Ill., assignor to International Harvester Company, a corporation of New Jersey Application June 14, 1935, Serial No. 26,651

4 Claims. (Cl. 97—207)

This invention relates to an improved cultivator knife weeder blade, and has for its principal object the provision of a blade which will have a plurality of adjustments, so that the blade may be adjusted to run parallel with the ground or at various angles depending upon the result desired.

The main object of the invention is to provide a shank for the standard of a knife weeder blade in which the shank is so shaped that the knife weeder blade may be adjusted so that the face of the blade is vertical to the ground or the blade may be so adjusted that the face may have a plurality of angular adjustments relative to the ground and also that the weeder blade may be adjusted in a vertical plane parallel to the surface of the standard in a plurality of positions.

Another object of the invention is to provide a shank in which a plurality of the weeder blades may be placed back to back and adjusted about the shank to form a hiller blade which may be used in hilling wherever the crops require it.

Another object is to so shape the shank of the standard and the weeder blade that the ground in the path of the blade may be left level and the soil thrown either way.

Another object is to provide adjustments for the shank of the standard and a plurality of the weeder blades such that a ditching tool may be formed which will leave a ditch of any desired depth or width and leave the ditch clean with a uniform bank along its side.

Another object of my invention is to provide for forming a duck foot blade by positioning a pair of blades on the shank of the standard and also providing for adjustment whereby the duck foot type blade for weeding may be tilted at any given angle.

Another object is to provide blades adapted for blocking or thinning such plants as cotton, beets, etc.

In accomplishing the foregoing objects and other minor objects which will hereinafter be more specifically described and defined in the claims, the preferred forms of the improved details of structure are illustrated in the accompanying drawing wherein:

Figure 1 is a perspective view of the knife weeder blade and adjusting shank;

Figure 2 is a front elevation of a plurality of blades and shanks secured to a shank standard with the blades adjusted as a hiller blade;

Figure 3 is a sectional view along lines 3—3 of Figure 4 in the direction of the arrows;

Figure 4 is a plan view of Figure 2 with the knife weeder blades attached to the shanks and a standard for hilling;

Figure 5 is a perspective view of the adjusting ball for the knife weeder blades; and, Figure 6 is a front elevation showing part of the knife weeder blade with the semi-spherical boss on the opposite side of the blade as shown in Figures 1 and 2.

The invention is herein disclosed in combination with a knife weeder blade and particular standard having the lower shank adaptable for adjusting the knife weeder blades thereon in a plurality of positions. The knife weeder blades are generally used in pairs with one having a right hand blade and the other a left hand blade. Each knife weeder blade 10 comprises a forwardly extending cutting blade 11 having a sharp undercut front edge portion. The blade is turned outwardly and rearwardly at the bottom to form a relatively narrow knife portion 12 which is sharpened in the front edge, and this edge is a continuation of the front edge of the forwardly extending cutting blade extending rearwardly from the forwardly extending cutting blade 11, and in the same plane, is a shield 13 which acts to shield the plants from clods or stones when the blade is used in cultivating.

Intermediate the forwardly extending cutting blade 11 and the shield 13 is located the upwardly and outwardly extending arcuate portion 14. Secured to this extending arcuate portion 14 is the ball shaped member 15 best shown in Figure 5. This ball shaped member 15 is loosely secured to the arcuate portion 14 by an outwardly extending lug portion 16 which engages a hole 16a in the arcuate portion 14 of the knife weeder blade. Adjustably mounted on the ball shaped member 15 is the adjusting shank 17 having a socket portion 18 as best shown in Figure 3, engaging the ball portion 15. For securing the ball shaped portion 15 of the knife weeder blade 10 to the socket portion of the shank, there is the washer 19 with the bolt 20 engaging the washer 19 and passing through an enlarged hole 21 in the socket member 18 and the holes 22 and 23 in the ball shaped portion 15 and the arcuate member 14 respectively. It is thus seen that by the ball and socket joint just described that the knife weeder blade 10 may be adjusted in a plurality of positions with respect to the shank standard 24.

It is thus seen that the knife weeder blade 10 may be adjusted in a plane parallel to the shank standard 24 by means of the ball portion 15 pivoting about the bolt 20 and any angularity when the blade is being adjusted in this position may be compensated by the enlarged hole 21. When it is necessary to tilt the knife weeder blade 10 so that the plane of the forwardly extending cutting blade 11 and the shield 13 is at an angle to the plane of the shank standard 24, it is done by means of the enlarged hole 21 and the socket member 18.

As shown in Figures 2, 3, and 4, a plurality of knife weeder blades 10 and 10' are secured with the adjacent faces formed by the forwardly extending cutting blades 11 and 11' and the rearwardly extending shield portion 13 together. These knife weeder blades 10 and 10' are secured to the shank 24 by the shank portions 17 and 17' as best shown in Figures 2 and 3. In these figures, the right and left hand members are designated by like reference characters which are primed to show members of the opposite hand. The ball member 15 and the shank member 17 are symmetrical and may be used interchangeably as right and left hand members. It is to be understood that the surfaces of the ball member 15 and the socket member may be corrugated or otherwise roughened so that the members when locked in adjusted position may be rigidly secured. The shank member 17 where the standard 24 may be secured, has the depressed portions 25 and 26. The standard 24 may be positioned on either side in case the blades are used as ditching blades and more rigidity is needed. The standards 24 may be secured in the dotted position of Figure 2.

The arcuate portion 14 of the knife weeder blade 10 is so proportioned that the portion 27 supports the arcuate portion 14 and also acts as a shield for the shank 17, with the blades as shown in Figure 2. With the standard 24 positioned as shown, the blades 10 and 10' may be used for hilling; and, whenever angular adjustment is needed of the blades in the vertical plane, this may be secured by adjusting the blades relative to the shank 17, as has been previously set forth.

With the blade 10 secured to the shank 17 as shown in Figure 1, the blade is used in blocking or cultivating. As has been previously pointed out, the shank 24 may be secured in either depression 25 or 26 as needed. Figure 1 shows a knife weeder blade 10 which is constructed as a left hand member. It is to be understood that a suitable right hand knife weeder blade may be used. In cultivating it is customary to use the right and left hand knife weeder blade in pairs with the knife weeder blade on either side of the plant row. It is to be understood that when necessary, adjustment of a knife weeder blade 10 in a vertical plane about the shank standard 24 may be secured by adjusting the blades by means of the ball and socket construction previously described. The position of the knife weeder blade 10 may have the plane of the knife weeder blade 10 through the portions 11 and 13 of the knife weeder blade positioned at an angle to the plane of the standard 24 by adjusting the knife weeder blade 10 by the enlarged hole 21 and the socket member 18 of the shank 17. This adjustment just previously described is used when it is necessary in blocking or cultivating.

It is to be understood that this same adjustment may also be used for the shank and knife weeder blade when it is set up for a similar knife weeder blade which is right handed as to the left hand knife weeder blade as shown in Figure 1. When used in this manner as a right hand knife weeder blade, the shank portion 17 and the ball portion 15 may be used respectively for either hand of the knife weeder blade. It is to be understood that the standard 24 at its upper end is suitably secured to the cultivator beams of a cultivator and that the standards in turn may be adjusted relative to the cultivator beams by suitable brackets thereon. The blades 10 may be of any suitable material and may be also hardened and heat treated. The cutting edges of the forwardly extending portion 11 and the knife blade 12 are suitably sharpened and the surfaces are suitably polished to aid in scouring.

When employed for cultivating of row crops, the knife weeder blades are arranged in pairs of opposite hands so that the blades will travel on opposite sides of the row, as best shown in Figure 1. As the blades are drawn along the row, the sharp front edges of the forwardly extending portion 11 of the blades 10 cut the soil along each side of the plant row so as to prevent the disturbing of the soil around the roots of the plant. The knife blade portions 12 pass under the soil between the rows of the plants cutting the weeds and stirring the soil.

As best shown in Figures 1 and 4, a V-portion 28 is formed between the rearwardly extending shield portion at 13 and the knife blade portions at 12 so that when the blade 10, as shown in Figure 1, is used in cultivating, the shields 13 protect the plants from clods and stones while the fine soil is permitted to pass over the knife surface 12 and entering the V-portion 28 packs up closely about the plants.

The knife portions 12 are usually set at a slightly upwardly inclined angle which will cause the blades to properly weed and loosen the soil; however, in trashy ground the blades can be turned at an abrupt angle to the ground line by adjusting the blades by means of the ball portion 15 with respect to the standard 24 so that the blades 12 will automatically clear themselves.

When the blades are used for hilling, as best shown in Figures 2, 3, and 4, the soil will be separated between the rows of the plants and carried by the blades 12 towards the rows of the plants and piled against the plants.

The blades, when used in ditching between the rows, are in the position as shown in Figures 2, 3, and 4, but the rear portions of the knife weeder blades 10 and 10' are adjusted upwardly at an acute angle relative to the standards 24 and 24' as shown in the dotted line of Figure 2 by means of the ball and socket joint formed by the ball portion on the blade and the socket on the shank. With the knife weeder blades thus set for ditching, the blades 12 part the soil, and shape and form a V-shaped ditch between the rows with the blades 12 depositing the soil alongside the plants. The width, depth, or angle of this ditch may be adjusted by changing the angularity of the blades 10 and 10' by means of the ball and socket joint previously described. When used for ditching it may be necessary to secure the standards 24 and 24' to the shanks 17 and 17' respectively as shown in the dotted lines of Figure 2 in order to have a more rigid shank and standard structure because of the earth pressure against the blades 10 and 10'.

When it is necessary to use the blades 10 and 10' for weeding between close rows, the shank and blades may be assembled as shown in Figures 2, 3, and 4, and when positioned in this manner the blades 10 and 10' are close together so that they will function as a unit.

When using these blades, as shown in Figure 1, to block or thin the plant rows of such crops as sugar beets or cotton, the blades are secured as shown in Figure 1 and the standards 24 are adjusted on the cultivator beams so that every two blades 12 will overlap leaving the desired width of block between each pair of the overlapped blades; and, using these blades for blocking or thinning, the cultivator with these blades attached is drawn laterally across the rows of the planted crops. As the rows are being blocked, the shields 13 prevent the plants left in the blocked space from being disturbed.

The preferred embodiment of the invention herein described is capable of certain modifications without departing from the scope of the invention to be defined in the following claims.

What is claimed is:

1. The combination with a cultivator standard having a shank portion, of a cultivator blade having an upwardly extending portion intermediate a forwardly extending cutting blade and a rearwardly extending shield portion, means on said upwardly extending portion adapted for adjusting the cultivator blade relative to the cultivator standard, said means comprising a detachable semi-spherical boss, means for securing the semi-spherical boss to the upwardly extending portion on either side of the upwardly extending portion, and means on the shank portion for retaining the cultivator blade in its adjusted position.

2. The combination with a cultivator standard having a shank portion with a plurality of socket members thereon, of a plurality of cultivator blades, one right hand and the other left hand, each blade having an upwardly and outwardly extending portion forming a contiguous shield intermediate a forwardly extending cutting blade and a rearwardly extending shield portion, and the surfaces of the cutting blade and the shield portion of each blade placed back to back, means adapted for pivoting said cultivator blades relative to said standard, said means comprising an inwardly extending semi-spherical boss rearwardly mounted with respect to the contiguous shield of each blade, and means coacting with the socket members and the semi-spherical bosses for retaining the cultivator blades in their adjusted position.

3. As an article of manufacture, a cultivator blade having an upwardly and outwardly extending portion forming a contiguous shield intermediate a forwardly extending cutting blade and a rearwardly extending shield portion, means on said upwardly extending portion adapted for adjusting the cultivator blade, said means comprising a detachable semi-spherical boss, and means for securing the semi-spherical boss to the upwardly extending portion on either side of the upwardly extending portion.

4. As an article of manufacture, a cultivator blade having an upwardly and outwardly extending portion forming a contiguous shield intermediate a forwardly extending cutting blade and a rearwardly extending shield portion, means on said upwardly extending portion adapted for adjusting the cultivator blade, said means comprising a detachable semi-spherical boss rearwardly mounted with respect to the contiguous shield, and means for securing the semi-spherical boss to the upwardly extending portion whereby the boss may be positioned rearwardly and inwardly with respect to the contiguous shield, or outwardly and rearwardly with respect to the contiguous shield.

ALEXUS C. LINDGREN.